Sept. 22, 1942.   E. L. KASTLER   2,296,469
TRUNK PISTON
Filed Jan. 10, 1939

Inventor:
Edward L. Kastler
By [signature] Atty.

Patented Sept. 22, 1942

2,296,469

UNITED STATES PATENT OFFICE 2,296,469

TRUNK PISTON

Edward L. Kastler, Waukegan, Ill., assignor of one-half to Paul S. Mantonya, Chicago, Ill.

Application January 10, 1939, Serial No. 250,197

6 Claims. (Cl. 309—20)

The principal objects of the invention are to provide two direct and continuous paths for conveying heat from the piston head to the cylinder wall; to provide unattached oblique bearing engagement of a core with the piston head; and to prevent contact of the piston head, when heated, with the cylinder wall.

Figure 1:
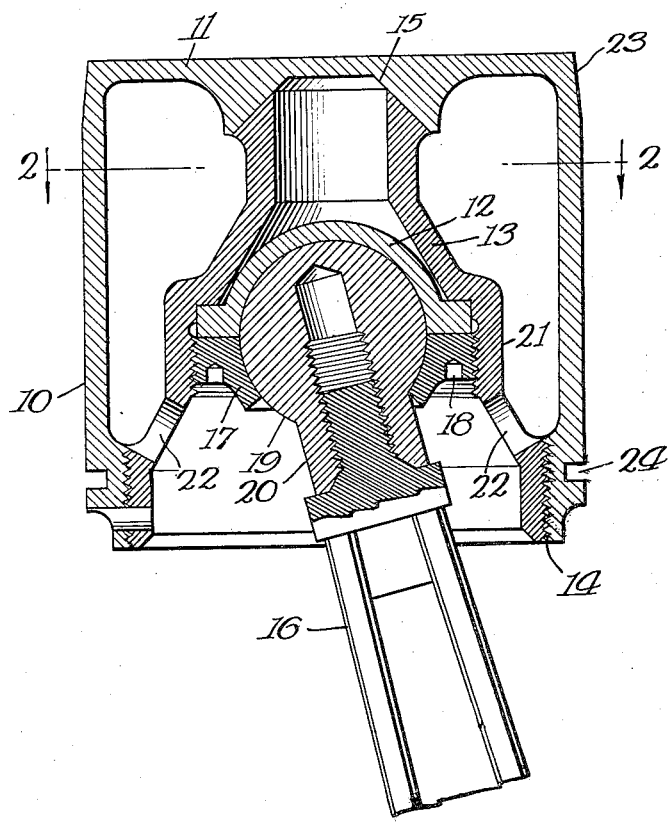
Figure 2:
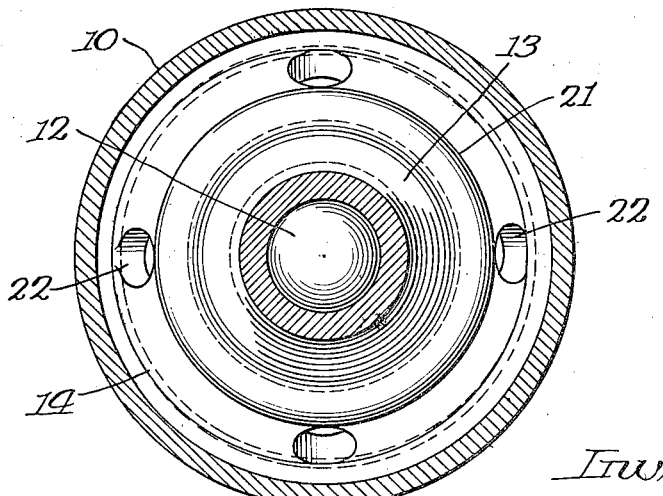

Other desirable features of improvement will appear in connection with the description of the drawing illustrating the invention, in which Fig. 1 is a longitudinal central section of the piston and a portion of a pitman connected therewith;

Fig. 2 is a transverse section on the line 2—2 of Fig. 1.

The piston comprises a chambered body 10 having one closed end 11. The pitman bearing 12, preferably in spherical form, as shown is located on the longitudinal axis of the piston and is carried by a core element 13 having a positive bearing on the end wall thereof and with the side walls adjacent the open end. As shown, this core is roughly in the shape of a truncated cone. It is interlocked with the side walls of the piston adjacent the open end of the latter by any suitable means; as shown at 14 by means of screw threads. The inner end of the core may be annular and tapering in form and fits within a complementary socket 15 formed on the inner face of the wall 11.

Intermediate of the ends of the core it is shaped to receive the elements of the bearing for the connecting rod 16. The inner of these elements, 12, fits within the chamber of the core and is held in place by the outer element 17 which is in threaded engagement with the core and is shaped for engagement by a suitable wrench, being shown as provided with sockets 18 for cooperating with a wrench of the spanner type. When, as shown, the pitman bearing is of the ball and socket type the inner faces of the bearing elements together define a section of a sphere to accommodate the ball 19 of the pitman, a suitable opening being left for the shank 20 thereof.

The skirt portion 21 of the core is preferably provided with ventilating openings 22. For convenience in assembling the parts, the shank 20 of the ball 19 is provided with a threaded socket, as shown, to receive the threaded end of the pitman.

Preferably the inner end of the piston, is slightly tapered for the short distance to which any material expansion will extend, as indicated at 23.

It has been the practice to make trunk pistons of uniform diameter throughout their length and in order to prevent the binding of the head when expanded, by reason of the high temperature to which it is subjected, this diameter has necessarily been substantially less than the diameter of the cylinder, and expansion rings have necessarily been used to close the gap. The improvement in piston bodies, as shown in the drawing, consists in forming the body, beyond the head of such diameter that it may make rubbing contact with the cylinder walls, when the engine is operated at ordinary speeds, the forward end being reduced in diameter sufficiently as by tapering to permit the normal expansion of the head without making cylinder contact. The taper is extended a short distance beyond the plane of the inner face of the head. The side face of the piston is plain and free from expansion rings from the end face, for a substantial distance beyond the tapered portion. As shown in the drawing, this uninterrupted zone extends to the ring channel 24, located adjacent to the open end of the piston. The temperature of the piston head is kept within safety limits by the escape of heat therefrom through the core and the side wall to the cylinder. These metallic paths for the heat have no interruptions, the circumferential contact of the piston with the cylinder wall through the area traversed by the piston being practically as intimate as if the parts were integral.

Under some circumstances it may be desirable to provide a single piston ring adjacent the outer end of the piston and to accommodate such ring there is shown on the drawing an annular channel 24.

Any suitable system of lubrication for the pitman bearing may be adopted. As shown the construction is suitable for a splash system.

I claim as my invention:

1. In a trunk piston having a chambered body having one end closed and provided on the inner face of such end with a central boss having an annular axially inclined face, a pitman bearing within the chamber, and a carrier for the bearing having threaded engagement with the side walls of the piston and having an inner end face complementary in form and engageable with the boss and being out of engagement with the flat portion of the closed end of the piston.

2. In a trunk piston having a chambered body having one end closed and provided on the inner face of such end with a central boss having an axially flaring face, a pitman bearing within the chamber, and a carrier for the bearing having threaded engagement with the side walls of the piston and having an inner end face complementary in form and engageable with the boss and being out of engagement with the flat portion of the closed end of the piston.

3. A trunk piston having on its head wall an instanding boss having an axially inclined face, a core fixedly attachable to the side wall of the body, the inner end of the core being complementary to and in unattached bearing engagement with the inclined face of the boss.

4. A trunk piston having at the central zone of the inner face of its head an instanding axially inclined bearing wall, and having a core fixedly attachable to its body adjacent to its open end, the inner end of the core being complementary to and in unattached engagement with the inclined bearing wall.

5. A trunk piston comprising in combination a core element and a chambered cylindrical body having an imperforate head, the outer end of the core element being in threaded engagement with the outer end of the cylindrical body, and the inner end of the core element and the inner face of the head having complementary surfaces which are oblique to the axis of the body and are held in mutual bearing contact by the threaded engagement of said outer ends.

6. A trunk piston having in combination a chambered body, a head, and a core located within the chamber and spaced at its inner end from the side wall of the body, said core having its outer end attached to the side wall of the body adjacent to the outer end thereof and having its inner end unattached to the head but having an axially oblique end surface engaged with the central zone of the head.

EDWARD L. KASTLER.